United States Patent
Li et al.

(10) Patent No.: US 11,888,315 B2
(45) Date of Patent: Jan. 30, 2024

(54) ENERGY STORAGE TRANSIENT POWER COORDINATED CONTROL METHOD FOR RESTRAINING SUBSEQUENT COMMUTATION FAILURES

(71) Applicants: STATE GRID HENAN ELECTRIC POWER RESEARCH INSTITUTE, Henan (CN); HUAZHONG UNIVERSITY OF SCIENCE AND TECHNOLOGY, Hubei (CN)

(72) Inventors: Chenghao Li, Henan (CN); Wei Yao, Hubei (CN); Mingyang Liu, Henan (CN); Hongyu Zhou, Hubei (CN); Wei Cui, Henan (CN); Jingyu Wen, Hubei (CN); Ning Zhou, Henan (CN); Yufei Rao, Henan (CN); Ze Gao, Henan (CN); Han Xiao, Henan (CN)

(73) Assignees: STATE GRID HENAN ELECTRIC POWER RESEARCH INSTITUTE, Henan (CN); HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 257 days.

(21) Appl. No.: 17/622,247

(22) PCT Filed: Jul. 30, 2021

(86) PCT No.: PCT/CN2021/109753
§ 371 (c)(1),
(2) Date: Dec. 23, 2021

(87) PCT Pub. No.: WO2022/156183
PCT Pub. Date: Jul. 28, 2022

(65) Prior Publication Data
US 2023/0135970 A1 May 4, 2023

(30) Foreign Application Priority Data

Jan. 25, 2021 (CN) .......................... 202110099174.8

(51) Int. Cl.
*H02J 3/16* (2006.01)
*H02J 3/00* (2006.01)
(Continued)

(52) U.S. Cl.
CPC ........ *H02J 3/00125* (2020.01); *H02J 3/0012* (2020.01); *H02J 3/16* (2013.01);
(Continued)

(58) Field of Classification Search
CPC ........ H02J 3/00125; H02J 3/0012; H02J 3/16; H02J 3/32; H02J 3/36; H02J 2203/10
See application file for complete search history.

(56) References Cited

U.S. PATENT DOCUMENTS 11,223,229 B2 * 1/2022 Lee .......................... H02J 9/062

FOREIGN PATENT DOCUMENTS

CN 105958504 9/2016
CN 108701998 10/2018
(Continued)

OTHER PUBLICATIONS

"International Search Report (Form PCT/ISA/210) of PCT/CN2021/109753," dated Oct. 28, 2021, pp. 1-4.
(Continued)

*Primary Examiner* — Adolf D Berhane
(74) *Attorney, Agent, or Firm* — JCIP GLOBAL INC.

(57) ABSTRACT

The invention discloses an energy storage transient power coordinated control method for restraining subsequent commutation failures, which includes: detecting DC current, AC bus voltage and arc quenching angle on the inverter side; Controlling the energy storage power station to enter the
(Continued)

transient control mode when the DC current is greater than the first current threshold or the AC bus voltage is less than the voltage threshold or the arc quenching angle is less than the first arc quenching angle threshold. By detecting the DC current and arc quenching angle on the inverter side, the active power output time instruction and reactive power output time instruction are determined respectively. The active power output amplitude instruction is determined by detecting the AC bus voltage, and the reactive power output amplitude instruction is determined by using the constraint of the total energy storage capacity.

18 Claims, 7 Drawing Sheets

(51) Int. Cl.
*H02J 3/32* (2006.01)
*H02J 3/36* (2006.01)

(52) U.S. Cl.
CPC ............... *H02J 3/32* (2013.01); *H02J 3/36* (2013.01); *H02J 2203/10* (2020.01)

(56) References Cited

FOREIGN PATENT DOCUMENTS

| | | |
|---|---|---|
| CN | 109347133 | 2/2019 |
| CN | 109861267 | 6/2019 |
| CN | 110212565 | 9/2019 |
| CN | 111864781 | 10/2020 |
| CN | 111900747 | 11/2020 |
| CN | 112865165 | 5/2021 |
| KR | 20140036797 | 3/2014 |

OTHER PUBLICATIONS

"Written Opinion of the International Searching Authority (Form PCT/ISA/237) of PCT/CN2021/109753," dated Oct. 28, 2021, pp. 1-6.

* cited by examiner

Continuously detect the real-time DC current on the inverter side, the AC bus voltage and the arc quenching angle on the inverter side. When the real-time DC current is greater than the first current threshold or the AC bus voltage is less than the voltage threshold or the real-time arc quenching angle is less than the first arc quenching angle threshold, the energy storage power station is controlled to enter the transient control mode; — S1

The output time instruction corresponding to the active output of energy storage is determined by using the relationship between the real-time DC current and the first current threshold and the second current threshold. The first current threshold is greater than the second current threshold. The output time instruction corresponding to the reactive power output of energy storage is determined by using the relationship between the real-time inverter arc quenching angle and the first arc quenching angle threshold and the second arc quenching angle threshold. The first arc quenching angle threshold is less than the second arc quenching angle threshold; — S2

The output amplitude instruction is determined by the relationship between the AC bus voltage and the voltage threshold, and the output amplitude instruction corresponding to the reactive power output of the energy storage is determined by using the constraint of the total energy storage capacity; — S3

The energy storage active power instruction and the energy storage reactive power instruction of the target output range are issued to the energy storage power station at the target output time, the output time instruction carries the target output time, and the output amplitude instruction carries the target output amplitude. — S4

FIG. 1 when it is detected that the DC current is greater than the first current threshold, an active power descending edge instruction is issued, and the value of the active power output time instruction $P_T$ is -1. The active power descending edge instruction is used to control the energy storage power station to absorb the active power of the inverter side of the HVDC transmission system. When it is detected that the arc quenching angle is less than the first arc quenching angle threshold, a reactive power rising edge instruction is issued, and the value of the reactive power output time instruction $Q_T$ is 1. The reactive power rising edge instruction is used to control the energy storage to release reactive power to the inverter side of the HVDC system. — S201 when it is detected that the DC current decreases and is successively lower than the first current threshold and the second threshold, the $P_T$ is maintained as -1; when the arc quenching angle is detected to increase and is larger than the first arc quenching angle threshold and the second arc quenching angle threshold, the $Q_T$ is maintained to be 1. — S202 when it is detected that the DC current rises to exceed the second current threshold, the PT is changed to 0; when the detected arc quenching angle is reduced to less than the second arc quenching angle threshold, the QT is changed to 0. — S203 when it is detected that the DC current rises to exceed the first current threshold, or when the real-time arc quenching angle is reduced to less than the first arc quenching angle threshold, step S201 is performed. — S204

S301: when the AC bus voltage is lower than the voltage threshold, the first amplitude value is high with the gate $P_{A1}$ output level. When the real-time DC current exceeds the preset range, the instability of the energy storage station is determined, and the output level of the second amplitude and gate $P_{A2}$ is high. ;

S302: when both the first amplitude value and the gate $P_{A1}$ and the second amplitude and gate $P_{A2}$ output high voltage, the output amplitude instruction of the first gear output is selected, and the output value is recorded as $P_1$. Otherwise, the output amplitude instruction of the second gear output is selected, and the output value is recorded as $P_2$. Among them, $P_1 > P_2$ S303: the reactive power output amplitude instruction is determined according to the active power output instruction and the capacity constraint of energy storage itself.

FIG. 5

S401: determining the target output time from the rising edge time or falling edge time in the output time instruction; taking the output amplitude instruction corresponding to the output value as the target output amplitude;

S402: the energy storage active power instruction corresponding to the target output amplitude is output at the time of target output, and the value of the energy storage active power instruction is the algebraic product of the value of the active power output time instruction and the value of the active power output amplitude instruction. When the target output time, the energy storage reactive power instruction corresponding to the target output amplitude is output, and the value of the energy storage reactive power instruction is the algebraic product of the reactive power output time instruction value and the reactive power output amplitude instruction value.

ENERGY STORAGE TRANSIENT POWER COORDINATED CONTROL METHOD FOR RESTRAINING SUBSEQUENT COMMUTATION FAILURES

CROSS-REFERENCE TO RELATED APPLICATION

This application is a 371 of international application of PCT application serial no. PCT/CN2021/109753, filed on Jul. 30, 2021, which claims the priority benefits of China Patent Application No. 202110099174.8, filed on Jan. 25, 2021. The entirety of each of the above mentioned patent applications is hereby incorporated by reference herein and made a part of this specification.

TECHNICAL FIELD

The present invention falls in the technical field of multi-fed ultra-high voltage (UHV) AC/DC hybrid power grids, and more specifically, relates to an energy storage transient power coordinated control method for restraining subsequent commutation failures.

BACKGROUND TECHNIQUE

Commutation failure is one of the most common faults in high voltage direct current (HVDC) transmission system based on power grid commutation converter. After the commutation failure occurs, the DC voltage drops rapidly and the DC current increases sharply, which has a serious impact on the system, and even leads to the interruption of transmission power. With the successive investment of HVDC transmission projects, the characteristics of "strong DC and weak AC, multi-loop DC centralized feed" in the Chinese power grid have become increasingly prominent, and the supporting capacity of the receiving end of the power grid has declined. Ac system failure may induce multiple commutation failures of a single converter station, and even cause DC lock-up, which seriously threatens the safety of AC/DC hybrid power grid under the new form in China.

With the construction of large-scale energy storage power stations and 100-megawatt energy storage power stations on the grid side, the energy storage power stations can play a role in peak regulation, frequency regulation and stabilizing the power fluctuation after the new energy is connected to the grid. it can also provide transient active and reactive power emergency support for power grid faults. Compared with other forms of energy storage, electrochemical energy storage has the advantages of fast response, strong dynamic active and reactive power support, high environmental adaptability, short construction period, decentralized configuration, etc. Therefore, it can be regarded as a very high-quality regulation resource of the power grid.

After the first commutation failure of DC system, it is of great theoretical and practical significance to adopt an appropriate control strategy to make full use of the fast response and transient support capacity of electrochemical energy storage on the grid side, to provide transient power support for the AC system after fault, to reduce the number of subsequent commutation failures, and to improve the recovery ability of the power grid after a fault.

SUMMARY

Aiming at the defects and improvement requirements of the existing technology, The present invention provides an Energy Storage Transient Power Coordinated Control Method for Restraining Subsequent Commutation Failures, it is of great theoretical and practical significance to adopt appropriate control strategy to make full use of the fast response and transient support capacity of electrochemical energy storage on the grid side, to provide transient power support for the AC system after fault, to reduce the number of subsequent commutation failures, and to improve the recovery ability of the power grid after fault.

To achieve the above object, according to one aspect of the present invention, The present invention provides an Energy Storage Transient Power Coordinated Control Method for Restraining Subsequent Commutation Failures, include:

S1: Continuously detect the DC current on the inverter side, the AC bus voltage and the arc quenching angle on the inverter side. When the DC current is greater than the first current threshold or the AC bus voltage is less than the voltage threshold or the arc quenching angle is less than the first arc quenching angle threshold, the energy storage power station is controlled to enter the transient control mode;

S2: The output time instruction corresponding to the active output of energy storage is determined by using the relationship between the DC current and the first current threshold and the second current threshold. The first current threshold is greater than the second current threshold. The output time instruction corresponding to the reactive power output of energy storage is determined by using the relationship between the inverter arc quenching angle and the first arc quenching angle threshold and the second arc quenching angle threshold. The first arc quenching angle threshold is less than the second arc quenching angle threshold;

S3: The output amplitude instruction is determined by the relationship between the AC bus voltage and the voltage threshold, and the output amplitude instruction corresponding to the reactive power output of the energy storage is determined by using the constraint of the total energy storage capacity;

S4: The energy storage active power instruction and the energy storage reactive power instruction of the target output range are issued to the energy storage power station at the target output time, the output time instruction carries the target output time, and the output amplitude instruction carries the target output amplitude.

Further, The step S2 comprises:

S201: when it is detected that the DC current is greater than the first current threshold, an active power descending edge instruction is issued, and the value of the active power output time instruction $P_T$ is −1. The active power descending edge instruction is used to control the energy storage power station to absorb the active power of the inverter side of the HVDC transmission system. When it is detected that the arc quenching angle is less than the first arc quenching angle threshold, a reactive power rising edge instruction is issued, and the value of the reactive power output time instruction $Q_T$ is 1. The reactive power rising edge instruction is used to control the energy storage to release reactive power to the inverter side of the HVDC system.

S202: when it is detected that the DC current decreases and is successively lower than the first current threshold and the second threshold, the $P_T$ is maintained as −1; when the arc quenching angle is detected to increase and is larger than the first arc quenching angle threshold and the second arc quenching angle threshold, the $Q_T$ is maintained to be 1.

S203: when it is detected that the DC current rises to exceed the second current threshold, the PT is changed to 0; when the detected arc quenching angle is reduced to less than the second arc quenching angle threshold, the $Q_T$ is changed to 0.

S204: when it is detected that the DC current rises to exceed the first current threshold, or when the real-time arc quenching angle is reduced to less than the first arc quenching angle threshold, step S201 is performed.

Further, After step S203, step S2 also includes:

S205: when the DC current $I_{dci}$ exceeds the second current threshold $I_{drefL}$ for the first time during the recovery process after the first commutation failure on the inverter side, an active power rising edge instruction is issued and the duration of the value PT of the output time instruction exceeds the active time threshold, so as to avoid short-term repeated trigger caused by high-frequency oscillation of the DC current near the second current threshold. When the arc quenching angle is lower than the second arc quenching angle threshold for the first time during the recovery process after each commutation failure on the inverter side, a reactive power falling edge instruction is issued and the duration of the value $Q_T$ of the output time instruction exceeds the reactive power time threshold, so as to avoid short-term repeated triggers caused by high-frequency oscillation of the arc quenching angle near the second arc quenching angle threshold.

Further, Before step S205, it also includes: Setting the active power time threshold to 8 ms and the reactive power time threshold to 5 ms.

Further, Step S3 includes:

S301: When the AC bus voltage is lower than the voltage threshold and the DC current exceeds the preset range, the output active output amplitude instruction value PA is recorded as P1; otherwise, the output active output amplitude instruction value $P_A$ is recorded as $P_2$, where, $P_1 > P_2$;

S302: the reactive power output amplitude instruction is determined according to the active power output amplitude instruction and the capacity constraint of energy storage itself.

Further, $$P_1 = 7.5\% \ P_{dc} + \frac{P_{dc}^2 f U_{f0.1}}{20 U_N^2};$$

Among them, $P_{dc}$ is the rated DC transmission power of HVDC system, rated frequency of f AC system, $U_N$ is the rated effective voltage of AC bus on the inverter side, and $U_{f0.1}$ is the AC bus voltage of 0.1 s after the AC bus fault on the inverter side.

$P_2 = 7.5\% \ P_{dc}$.

Further, The instruction of reactive power output amplitude is $Q_A = \sqrt{S_{BESS}^2 - (P_T P_A)^2}$, where $S_{BESS}$ is the energy storage capacity.

Further, before stp S302, it also includes:

Set the sample hold time of $U_{f0.1}$ to 1 s.

Further, step S4 includes:

S401: determining the target output time from the rising edge time or falling edge time in the output time instruction; taking the output amplitude instruction corresponding to the output value as the target output amplitude;

S402: the energy storage active power instruction corresponding to the target output amplitude is output at the time of target output, and the value of the energy storage active power instruction is the algebraic product of the value of the active power output time instruction and the value of the active power output amplitude instruction. When the target output time, the energy storage reactive power instruction corresponding to the target output amplitude is output, and the value of the energy storage reactive power instruction is the algebraic product of the reactive power output time instruction value and the reactive power output amplitude instruction value.

Further, before step S2, the method also includes:

when the DC current is less than or equal to the first current threshold, or when the AC bus voltage is greater than or equal to the voltage threshold, the control energy storage power station continues to maintain the energy storage active power instruction to 0. When the real-time arc quenching angle is greater than or equal to the first arc quenching angle threshold the energy storage power station is controlled to keep the value of the energy storage reactive power instruction to 0.

In general, compared with the prior art, the above technical proposal conceived by the invention can achieve beneficial effects including:

The invention determines the energy storage active power output time instruction and the reactive power output time instruction respectively by detecting the DC current and the arc quenching angle on the inverter side. Then, the active power output amplitude instruction is determined by detecting the AC bus voltage, and the reactive power output amplitude instruction is determined by using the constraint of the total energy storage capacity. thus, the energy storage active power instruction and reactive power instruction of the target output amplitude are issued to the energy storage power station at the time of target output. In this way, the invention is designed from three dimensions of energy storage output time, output amplitude and active and reactive power coordination, so as to make full use of the rapid response and transient support capacity of electrochemical energy storage on the grid side. so that the coordinated output of energy storage active and reactive power can be applied in the field of commutation failure suppression, which can effectively improve the transient control effect of energy storage power station on UHV AC/DC hybrid system. In particular, this can not only effectively prevent the serious impact on the power grid system caused by the rapid drop of DC voltage and the sharp increase of DC current after commutation failure, but also restrain the subsequent commutation failure after the first commutation failure after DC fault.

BRIEF DESCRIPTION OF THE DRAWINGS

FIG. 1 is a flow chart of a transient active and reactive power coordinated control method for suppressing subsequent commutation failures in an embodiment of the present invention.

FIG. 2 is a flow chart of step S2 in a transient active and reactive power coordinated control method for energy storage power stations to suppress subsequent commutation failures in an embodiment of the present invention.

FIG. 5 is a flow chart of step S3 in a transient active and reactive power coordinated control method for energy storage power stations to suppress subsequent commutation failures in an embodiment of the present invention.

FIG. 6 is a flow chart of step S4 in a transient active and reactive power coordinated control method for energy storage power stations to suppress subsequent commutation failures in an embodiment of the present invention.

(a), (b) and (c) of FIG. 10 are schematic diagrams of the simulation results of the commutation failure suppression effect of the invention when the grounding inductance L is 0.002H, 0.02H and 0.1H, respectively.

DESCRIPTION OF THE EMBODIMENTS

In order to make the purpose, technical scheme and advantages of the invention more clear, the invention is further described in detail in combination with the attached drawings and embodiments below. It should be understood that the specific embodiments described herein are used only to explain the invention and are not used to define the invention. In addition the technical features involved in the various embodiments of the invention described below can be combined with each other as long as they do not conflict with each other.

Referring to FIG. 1, combined with FIGS. 2 to 7, the invention provides an energy storage transient power coordinated control method for restraining subsequent commutation failures, which includes:

S1: continuously detect the real-time DC current $I_{dci}$ on the inverter side, the AC bus voltage $U_{aci}$ and the arc quenching angle γ on the inverter side. When the real-time DC current $I_{dci}$ is greater than the first current threshold $I_{drefH}$ or the AC bus voltage $U_{aci}$ is less than the voltage threshold $U_{acirefA}$ or the real-time arc quenching angle γ is less than the first arc quenching angle threshold $γ_1$, the energy storage power station is controlled to enter the transient control mode.

Specifically, the real-time DC current $I_{dci}$ on the inverter side and the AC bus voltage $U_{aci}$ on the inverter side are continuously collected and tested, and the first current threshold $I_{drefH}$ is 1.2pu, the second current threshold $I_{drefL}$ is 0.88ppu, $U_{acirefA}$ is 0.95pu, the first arc quenching angle threshold $γ_1$ is 12°, and the second arc quenching angle threshold $γ_h$ is 35°. If the amplitude of $I_{dci}$ is greater than the threshold $I_{drefL}$ or the amplitude of $U_{aci}$ is less than the voltage threshold $U_{acirefA}$ or the amplitude of γ is less than the threshold $γ_1$, the energy storage power station is determined to enter the transient control mode. In one embodiment, before step S2, the transient active and reactive power coordinated control method for suppressing subsequent commutation failures of the energy storage power station also includes: when the real-time DC current $I_{dci}$ is less than or equal to the first current threshold $I_{drefH}$, or when the AC bus voltage is greater than or equal to the voltage threshold, the control energy storage power station continues to maintain the energy storage active power instruction to 0. When the real-time arc quenching angle γ is greater than or equal to the first arc quenching angle threshold $γ_1$, the energy storage power station is controlled to keep the value of the energy storage reactive power instruction to 0.

S2: the output time instruction corresponding to the active output of energy storage is determined by using the relationship between the real-time DC current $I_{dci}$ and the first current threshold $I_{drefH}$ and the second current threshold $I_{drefL}$. The first current threshold $I_{drefH}$ is greater than the second current threshold $I_{drefL}$. The output time instruction corresponding to the reactive power output of energy storage is determined by using the relationship between the real-time inverter arc quenching angle γ and the first arc quenching angle threshold $γ_1$ and the second arc quenching angle threshold $γ_h$. The first arc quenching angle threshold $γ_1$ is less than the second arc quenching angle threshold $γ_h$.

Specifically, step S2 is to determine the output time instruction corresponding to the energy storage active power output time according to the detected real-time DC current $I_{dci}$, that is, when to release or absorb the active power to the HVDC system; and to determine the output time instruction corresponding to the energy storage reactive power output time according to the detected real-time arc quenching angle, that is, when to release or absorb the reactive power to the HVDC transmission system. For example, the process of determining the output time instruction is as follows: 1) when the DC current $I_{dci}$ is greater than the threshold $I_{drefH}$, the controller issues an instruction PT of −1 to control the energy storage to absorb the active power on the inverter side of the HVDC system; under the constant current control of the system, the DC current $I_{dci}$ will first decrease and less than $I_{drefH}$, $I_{dreL}$ and then continue to rise. When it is detected that the real-time arc quenching angle γ is less than the first arc quenching angle threshold $γ_1$, an instruction QT of reactive power rising edge is issued to control the energy storage to release reactive power to the inverter side of the HVDC transmission system. 2) when the DC current $I_{dci}$ rises to the threshold $I_{drefL}$, the controller issues an instruction that the rising edge PT is 0, and the control energy storage stops absorbing active power to the inverter side of the HVDC system; when it is detected that the real-time arc quenching angle γ decreases less than the second arc quenching angle threshold $γ_h$ and exceeds the first arc quenching angle threshold $γ_1$, the controller changes the QT to 0.3) if the DC current $I_{dci}$ crosses the threshold $I_{drefL}$ and reaches the threshold $I_{drefH}$ again, or when the falling real-time arc quenching angle γ is less than the first arc quenching angle threshold $γ_i$, continue to step 1); otherwise, the energy storage active power instruction and reactive power instruction of the energy storage power station are both 0.

S3: the output amplitude instruction is determined by the relationship between the AC bus voltage $U_{aci}$ and the voltage threshold $U_{acirefA}$, and the output amplitude instruction corresponding to the reactive power output of the energy storage is determined by using the constraint of the total energy storage capacity.

Specifically, step S3 determines the output amplitude instruction corresponding to the active power output of energy storage according to the relationship between the AC bus voltage $U_{aci}$ and the voltage threshold $U_{acirefA}$, and determines the reactive power output amplitude instruction according to the active power output instruction and the capacity constraint of the energy storage itself. the specific process is as follows: 1) in the active power control, when the voltage $U_{aci}$ falls beyond the threshold $U_{acirefA}$, the high level is output to the and gate $P_{A1}$ of the amplitude selection part. When the current $I_{dci}$ no longer fluctuates in a certain period of time, it is judged that the system is stable, and when the system is unstable, the high level is output to the selector and gate $P_{A2}$. 2) when the energy storage active power amplitude selection part receives the high voltage from $P_{A1}$ and $P_{A2}$ at the same time, the selector switches to the optimal output amplitude determination module $P_1$, otherwise it is in the P2 gear of the energy storage foundation output, and the final output is $P_A$, that is, $P_A=P_1$ or $P_A=P_1$; 3) the reactive power output amplitude instruction $Q_A$ is determined according to the active power output instruction and the capacity constraint of energy storage itself. In one of the embodiments, the output value $$P_1 = 7.5\% \ P_{dc} + \frac{P_{dc}^2 f U_{f0.1}}{20 U_N^2}$$

of the first gear output. Among them, $P_{dc}$ is the rated DC transmission power of HVDC system, rated frequency of f AC system, $U_N$ is the rated effective voltage of AC bus on the inverter side, and $U_{f0.1}$ is the AC bus voltage of 0.1 s after the AC bus fault on the inverter side. The output value of the second gear is $P_2=7.5\% \ P_{dc}$. The instruction of reactive power output amplitude is $Q_A=\sqrt{S_{BESS}^2-(P_T P_A)^2}$, where $S_{BESS}$ is the energy storage capacity.

It should be noted that the method is cycled in each control cycle (depending on the accuracy of the control system) of the transient control of the energy storage power station. In addition, the control parameters ($U_{acirefA}$, $I_{drefL}$, $I_{drefH}$, $\gamma_1$, $\gamma_h$) selected in the invention are artificially selected empirical values and can be adjusted appropriately. The selection principle of $U_{acirefA}$ is to determine that the AC/DC system is in the transient process of large disturbance; the selection principle of $I_{drefL}$ and $I_{drefH}$ is to determine that the DC is in the high risk stage of subsequent commutation failure in the process of commutation failure recovery. The selection principle of $\gamma_1$ and $\gamma_h$ is to ensure that the real-time turn-off angle is in the range of current deviation control in the recovery stage of commutation failure.

S4: the energy storage active power instruction and the energy storage reactive power instruction of the target output range are issued to the energy storage power station at the target output time, the output time instruction carries the target output time, and the output amplitude instruction carries the target output amplitude. Specifically, the target output time is determined according to the rising edge time or falling edge time in the output time instruction. Taking $P_1$ or $P_2$ as the target active output amplitude, the energy storage active power instruction of the target output amplitude is issued to the energy storage power station at the time of the target output. The value of the energy storage active power instruction $P_{ref}$ is the algebraic product of the value $P_T$ of the output time instruction and the value $P_A$ of the output amplitude instruction, that is, $P_{ref}=P_T*P_A$. The energy storage reactive power instruction of the target output amplitude is issued to the energy storage power station at the time of the target output. The value of the energy storage reactive power instruction $Q_{ref}$ is the algebraic product of the value $Q_T$ of the output time instruction and the value $Q_A$ of the output amplitude instruction, that is, $Q_{ref}=Q_T*Q_A$.

In one of the embodiments, as shown in FIG. 2. Step S2 includes: S201: when it is detected that the DC current is greater than the first current threshold, an active power descending edge instruction is issued, and the value of the active power output time instruction $P_T$ is −1. The active power descending edge instruction is used to control the energy storage power station to absorb the active power of the inverter side of the HVDC transmission system. When it is detected that the arc quenching angle is less than the first arc quenching angle threshold, a reactive power rising edge instruction is issued, and the value of the reactive power output time instruction $Q_T$ is 1. The reactive power rising edge instruction is used to control the energy storage to release reactive power to the inverter side of the HVDC system.

S202: when it is detected that the DC current decreases and is successively lower than the first current threshold and the second threshold, the $P_T$ is maintained as −1; when the arc quenching angle is detected to increase and is larger than the first arc quenching angle threshold and the second arc quenching angle threshold, the $Q_T$ is maintained to be 1.

S203: when it is detected that the DC current rises to exceed the second current threshold, the PT is changed to 0; when the detected arc quenching angle is reduced to less than the second arc quenching angle threshold, the $Q_T$ is changed to 0.

S204: when it is detected that the DC current rises to exceed the first current threshold, or when the real-time arc quenching angle is reduced to less than the first arc quenching angle threshold, stp S201 is performed.

Specifically, when it is detected that the DC current $I_{dci}$ is greater than the threshold $I_{drefH}$, the controller issues an instruction $P_T$ of −1 to control the energy storage to absorb the active power on the inverter side of the HVDC system. Under the constant current control of the system itself, the DC current $I_{dci}$ will first decrease and less than $I_{drefH}$, $I_{drefL}$, and then continue to rise. When it is detected that the real-time arc quenching angle $\gamma$ is less than the first arc quenching angle threshold $\gamma_1$, an instruction $Q_T$ of reactive power rising edge is issued to control the energy storage to release reactive power to the inverter side of the HVDC transmission system. When it is detected that the DC current $I_{dci}$ rises to the threshold $I_{drefL}$, the controller sends an instruction that the rising edge $P_T$ is 0, and the control energy storage stops absorbing active power to the inverter side of the HVDC system. When it is detected that the real-time arc quenching angle $\gamma$ is reduced to less than the second arc quenching angle threshold $\gamma_h$ and greater than the first arc quenching angle threshold $\gamma_1$, the controller changes the $Q_T$ to 0. If the DC current $I_{dci}$ crosses the threshold $I_{drefL}$ and reaches the threshold $I_{drefH}$ again, the active power falling edge instruction $P_T$ is −1. When the real-time arc quenching angle $\gamma$ is less than the first arc quenching angle threshold $\gamma_1$, the reactive power rising edge instruction $Q_T$ is 1. Otherwise, the energy storage active power instruction and reactive power instruction are both 0, and the energy storage power station is in a state of waiting for output.

Figure 3:
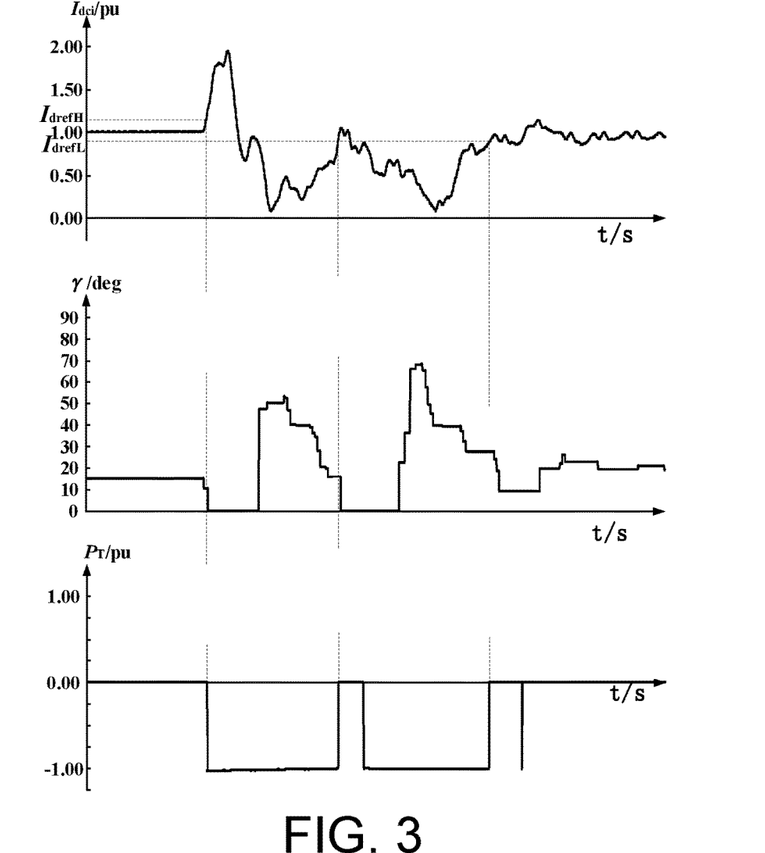
FIG. 3 is a schematic diagram of the active time output instruction of an energy storage power station in an embodiment of the present invention.
Figure 4:
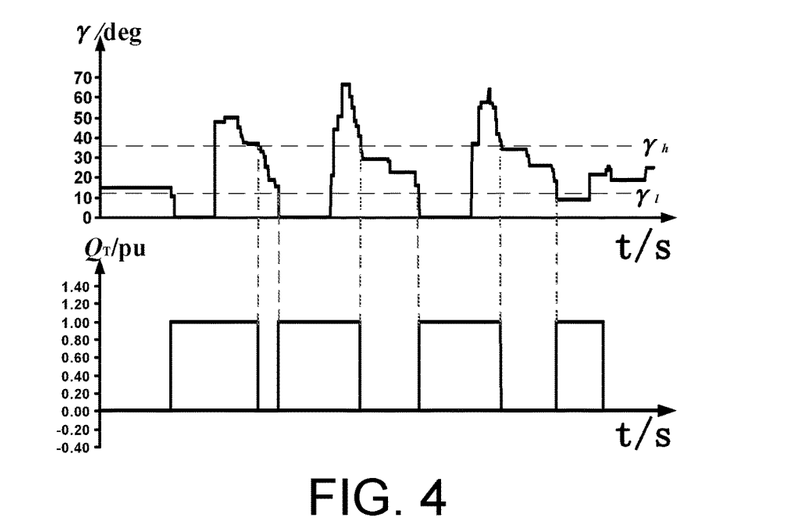
FIG. 4 is a schematic diagram of the reactive time output instruction of an energy storage power station in an embodiment of the present invention.

In one embodiment, after stp S203, step S2 also includes: S205: when the real-time DC current $I_{dci}$ exceeds the second current threshold $I_{drefL}$ for the first time during the recovery process after the first commutation failure on the inverter side, an active power rising edge instruction is issued and the duration of the value PT of the output time instruction exceeds the active time threshold, so as to avoid short-term repeated trigger caused by high-frequency oscillation of the real-time DC current near the second current threshold. When the real-time arc quenching angle is lower than the second arc quenching angle threshold for the first time during the recovery process after each commutation failure on the inverter side, a reactive power falling edge instruction is issued and the duration of the value $Q_T$ of the output time instruction exceeds the reactive power time threshold, so as to avoid short-term repeated triggers caused by high-frequency oscillation of the real-time arc quenching angle near the second arc quenching angle threshold. The two-time thresholds can be set according to the requirements, generally set at the millisecond level. In one embodiment, before stp S205, the transient active and reactive power coordinated control method for suppressing subsequent commutation failures of the energy storage power station also includes setting the active power time threshold to 8 ms and the reactive power time threshold to 5 ms. In this step, in order to avoid short-term repeated trigger caused by high-frequency oscillation near the threshold $I_{drefL}$ when the $I_{dci}$ rises to the threshold $I_{drefL}$, when the $I_{dci}$ exceeds the threshold $I_{drefL}$ for the first time in the recovery process after the first commutation failure, the shortest time for the controller to issue the rising edge instruction PT is 8 ms. In order to avoid short-term repeated triggers caused by high-frequency oscillation near the threshold $\gamma_h$, when $\gamma$ is less than the threshold $\gamma_h$ for the first time in the recovery process after the first commutation failure, the shortest time for the controller to issue the rising edge instruction $Q_T$ is 5 ms. It should be noted that after the first commutation failure, because the DC system itself has the function of regulation and control, the commutation conditions of the system will be improved, such as DC current and AC voltage recovery, which is the first commutation failure recovery process. If the transition is restored, it will lead to a second or subsequent commutation failure. The schematic diagram of energy storage reactive power time output instruction and the schematic diagram of energy storage active power time output instruction are shown in FIGS. 3 and 4 respectively.

In one of the embodiments, as shown in FIG. 5, step S3 includes: S301: when the AC bus voltage is lower than the voltage threshold, the first amplitude value is high with the gate $P_{A1}$ output level. When the real-time DC current exceeds the preset range, the instability of the energy storage station is determined, and the output level of the second amplitude and gate $P_{A2}$ is high. S302: when both the first amplitude value and the gate $P_{A1}$ and the second amplitude and gate $P_{A2}$ output high voltage, the output amplitude instruction of the first gear output is selected, and the output value is recorded as $P_1$. Otherwise, the output amplitude instruction of the second gear output is selected, and the output value is recorded as $P_2$. Among them, $P_1 > P_2$, the reactive power output amplitude instruction is determined according to the active power output instruction and the capacity constraint of energy storage itself.

In one of the embodiments, before stp S302, the transient active power control method of the energy storage power station also includes setting the sample and hold time of the $U_{f0.1}$ to 1s by default. In order to make P1 change dynamically with the fault recovery degree of DC system, the sample and hold time of $U_{f0.1}$ is set to 1s. After the end of sample and hold, whether to sample and sample size is decided according to whether the fault is removed and the fault degree. When the AC bus voltage is lower than the voltage threshold, the fault is judged to occur. The sampling time is 0.1s after the fault, and the sampling time is kept for 1s.

In one of the embodiments, as shown in FIG. 6, step S4 includes: S401: determining the target output time from the rising edge time or falling edge time in the output time instruction; taking the output amplitude instruction corresponding to the output value as the target output amplitude. S402: the energy storage active power instruction corresponding to the target output amplitude is output at the time of target output, and the value of the energy storage active power instruction is the algebraic product of the value of the active power output time instruction and the value of the active power output amplitude instruction. When the target output time, the energy storage reactive power instruction corresponding to the target output amplitude is output, and the value of the energy storage reactive power instruction is the algebraic product of the reactive power output time instruction value and the reactive power output amplitude instruction value.

Figure 7:
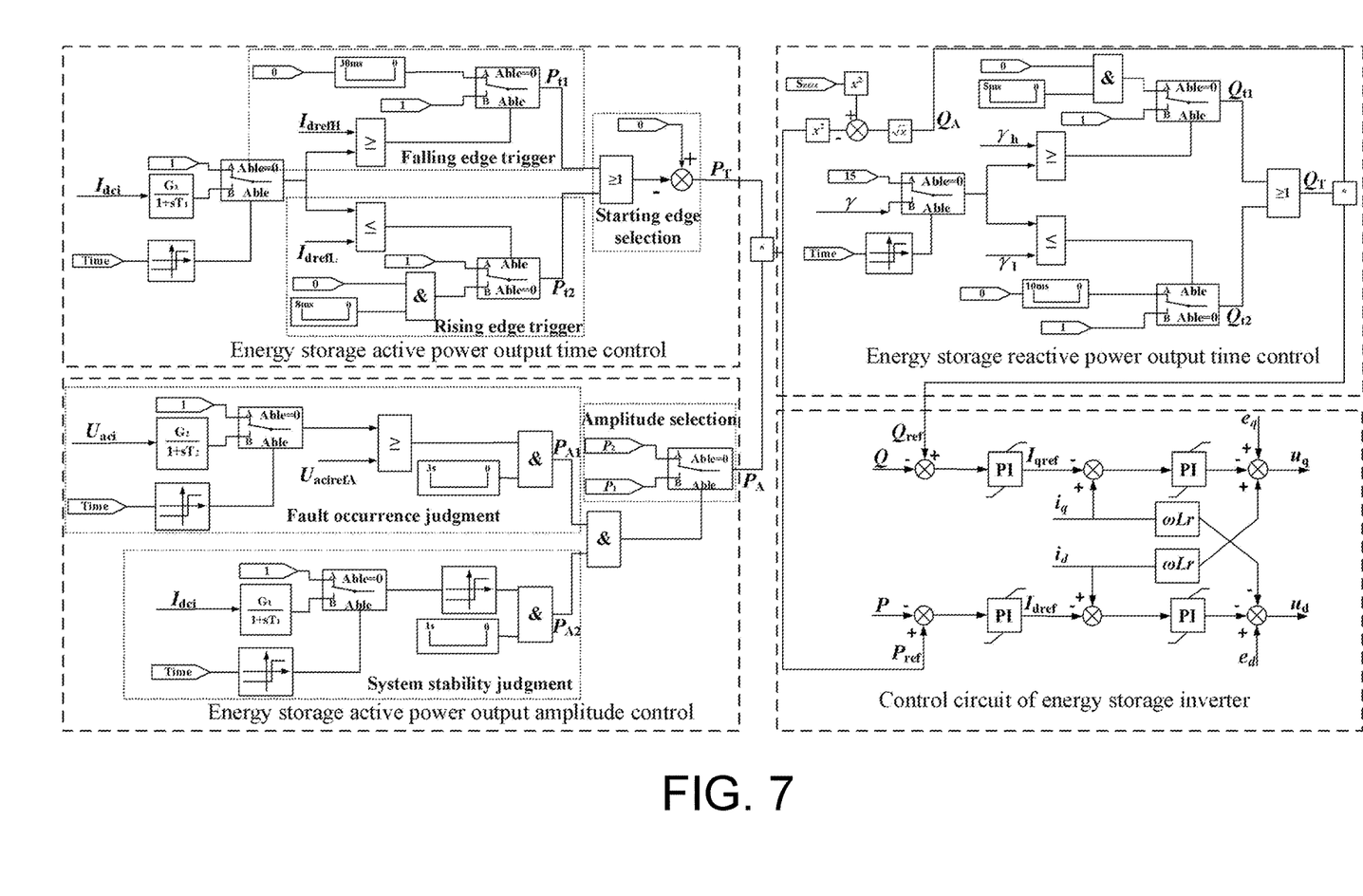
FIG. 7 is a logical block diagram of a transient active and reactive power coordinated control method for suppressing subsequent commutation failures in an energy storage power station provided by the present invention.

As shown in FIG. 7, after detecting the real-time DC current $I_{dci}$, the AC bus voltage $U_{aci}$ on the inverter side and the arc quenching angle $\gamma$, the whole process of energy storage active power instruction value $P_{ref}$ and reactive power instruction value Qref can be obtained according to $I_{dci}$, $U_{aci}$ and $\gamma$. Specifically, when the real-time DC current $I_{dci}$ is greater than the first current threshold $I_{drefH}$ or the AC bus voltage $U_{aci}$ is less than the voltage threshold $U_{acirefA}$, or the arc quenching angle $\gamma$ is less than the first arc quenching angle $\gamma_1$ threshold, the energy storage power station is controlled to enter the transient control mode. The output time instruction PT corresponding to the active output of energy storage is determined by using the relationship between the real-time DC current $I_{dci}$ and the first current threshold $I_{drefH}$ and the second current threshold $I_{drefL}$, and the first current threshold is greater than the second current threshold. The active power output amplitude instruction PA is determined by using the relationship between the AC bus voltage $U_{aci}$ and the voltage threshold $U_{acirefA}$. According to the output time instruction $P_T$ and the output amplitude instruction $P_A$, the energy storage active power instruction $P_{ref}$ of the target output amplitude is issued to the energy storage power station at the target output time. The output time instruction $Q_T$ corresponding to the reactive power output of energy storage is determined by using the relationship between the real-time inverter arc quenching angle $\gamma$ and the first arc quenching angle threshold $\gamma_1$ and the second arc quenching angle threshold $\gamma_h$. The first arc quenching angle threshold is less than the second arc quenching angle threshold. The output amplitude instruction $Q_A$ corresponding to the reactive power output of energy storage is determined by using the constraint of total energy storage capacity. According to the output time instruction $Q_T$ and the output amplitude instruction $Q_A$, the energy storage reactive power instruction $Q_{ref}$ of the target output amplitude is issued to the energy storage power station at the target output time. In the time control of active power output of energy storage, the purpose of delay 30 ms is to ensure that the controller maintains the original output mode when the DC current is in turn less than the first current threshold and the second current threshold. In the control of reactive power output of energy storage, the purpose of delay 10 ms is to ensure that the controller maintains the original output mode when the arc quenching angle jumps from less than the first arc quenching angle threshold to greater than the second arc quenching angle threshold.

Figure 8:
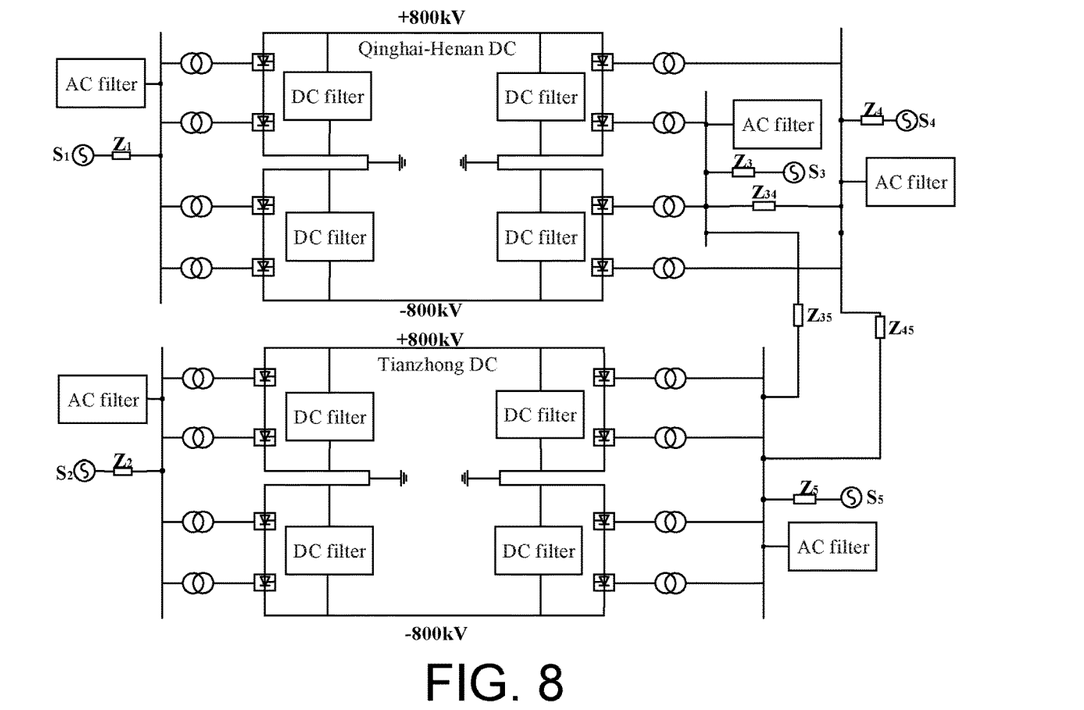
FIG. 8 is a schematic diagram of the Henan multi-infeed DC system model provided by the present invention.

In order to verify the technical effect of the control method provided by the invention, a simulation experiment is carried out by taking the Henan multi-feed DC system as a case of UHV AC/DC hybrid system. The corresponding simulation model is built in PSCAD/EMTDC, as shown in FIG. 8. Henan multi-infeed DC system includes two UHVDC transmission lines, Qinghai-Henan DC and Tianzhong DC. Their voltage levels are ±800 kV and the DC power transmitted in steady state is 8000 MW. The parameters in FIG. 8 are shown in Table 1.

TABLE 1 equivalent model impedance parameters of Henan multi-infeed DC receiver AC system

| Impedance No. | Parameter value | Impedance No. | Parameter value |
|---|---|---|---|
| Z5(Ω) | 0.5992 + j6.8484 | Z45(Ω) | 3.3994 + j38.8554 |
| Z4(Ω) | 0.7977 + j9.1169 | Z35(Ω) | 3.86436 + j44.1699 |
| Z3(Ω) | 0.5864 + j0.02133 | Z34(Ω) | 1.39404 + j15.9340 |

Figure 9:
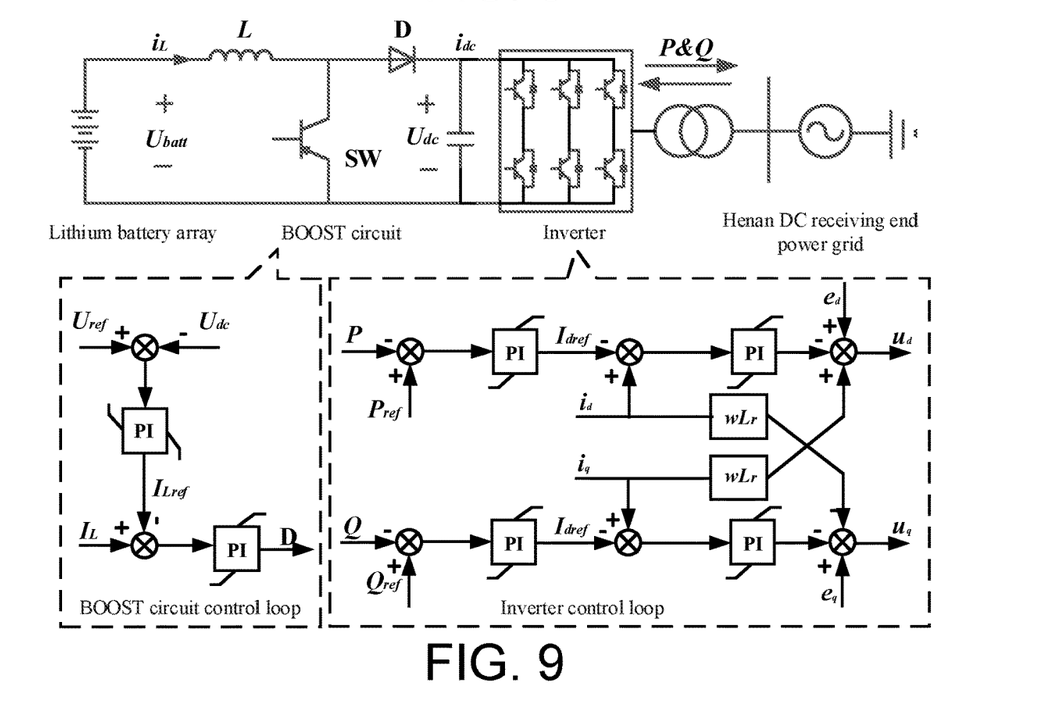
FIG. 9 schematic diagram of the lithium battery electrochemical energy storage power station model provided by the present invention.

In addition, the electrochemical energy storage power station model of lithium battery is built in PSCAD/EMTDC, as shown in FIG. 9. The model mainly consists of three parts: lithium battery array, Boost boost circuit and grid-connected inverter. The fixed power control is adopted in the energy storage power station, and the power output of the energy storage power station can be changed flexibly by changing the active and reactive power instructions $P_{ref}$ and $Q_{ref}$. A simulation example is given to verify the suppression effect of the proposed active power control strategy on the subsequent commutation failure of Henan multi-infeed DC system. The AC bus on the DC inverter side shown in FIG. 8 is set to have a three-phase ground fault through a certain size of grounding inductor at 0.5 s, and the duration is 0.1 s. The energy storage power station with the capacity of 1200 MVA is connected to the AC bus, and the active power control strategy of the energy storage power station adopts the active power control method proposed by the invention.

Figure 10:
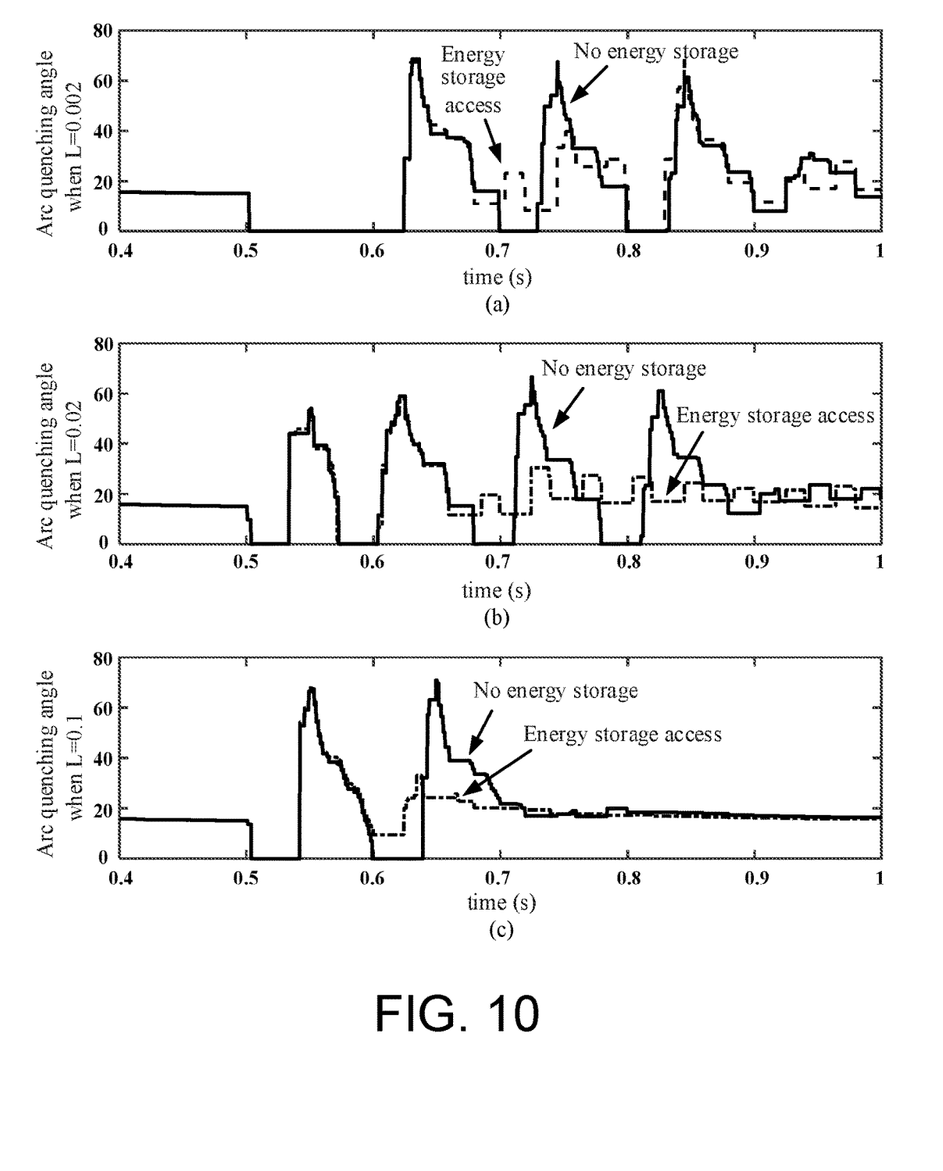

When the grounding inductance L is 0.002H, 0.02H and 0.1H respectively, the simulation results are shown in FIG. 10. It is generally believed that commutation failure occurs when the turn-off angle is less than 7°. It can be seen that when the energy storage power output is coordinated and controlled by the invention, the commutation failure can be suppressed under different fault degrees.

It should be added that, as shown in FIG. 8, a three-phase ground fault occurs through a certain size of grounding inductor on the AC bus on the DC inverter side, with a duration of 0.1s and an energy storage capacity of 1200 MVA. By changing the fault time and the size of the grounding inductor, several groups of working conditions are set for ergodic simulation, and the commutation failure suppression effects of energy storage under different working conditions are compared. Among them, Working condition 1: no energy storage access. Working condition 2: energy storage is connected and the coordinated control strategy of transient active power and transient reactive power is adopted. Working condition 3: energy storage is connected and only energy storage transient active power control strategy is adopted. Working condition 4: energy storage is connected and only energy storage transient reactive power control strategy is adopted, and the output amplitude is 1200 MVar.

Traversing the simulation results as shown in Table 2, we can see that in most working conditions, after energy storage is connected, it can effectively reduce the number of commutation failures after DC faults, and play a good control effect. Furthermore, under some working conditions, when energy storage is connected and the coordinated control mode of transient active power and transient reactive power is adopted, the number of DC commutation failures can be suppressed to a minimum, and the best control effect can be achieved by energy storage. From the ergodic simulation results, it can be seen that the proposed coordinated control strategy of transient active power and transient reactive power of energy storage power station has good applicability to different working conditions of the system.

In summary, the coordinated support of the transient power of the energy storage power station is an effective control method to suppress the subsequent commutation failure after the UHV DC system failure.

TABLE 2

| | Traversal simulation results | | | | | | | |
|---|---|---|---|---|---|---|---|---|
| | (Failure occurs at 0.50 s) Number of commutation failures | | | | (Failure occurs at 0.52 s) Number of commutation failures | | | |
| Ground inductance/H | Working condition 1 | Working condition 2 | Working condition 3 | Working condition 4 | Working condition 1 | Working condition 2 | Working condition 3 | Working condition 4 |
| 0.002 | 3 | 2 | 4 | 3 | 5 | 3 | 1 | 4 |
| 0.004 | 3 | 2 | 2 | 5 | 4 | 3 | 3 | 4 |
| 0.008 | 4 | 3 | 4 | 3 | 4 | 1 | 3 | 4 |
| 0.012 | 4 | 3 | 4 | 3 | 4 | 3 | 4 | 2 |
| 0.016 | 4 | 2 | 2 | 5 | 5 | 4 | 1 | 4 |
| 0.020 | 4 | 2 | 4 | 6 | 2 | 2 | 3 | 3 |
| 0.025 | 4 | 3 | 4 | 3 | 3 | 2 | 2 | 3 |
| 0.035 | 3 | 2 | 3 | 1 | 3 | 1 | 2 | 1 |
| 0.070 | 2 | 2 | 2 | 2 | 2 | 2 | 2 | 2 |
| 0.090 | 2 | 1 | 1 | 2 | 2 | 1 | 2 | 1 |
| 0.100 | 2 | 1 | 1 | 1 | 3 | 1 | 1 | 1 |

The invention provides a coordinated control strategy of transient active power and transient reactive power of energy storage power station suitable for UHV DC. The control strategy is designed from three dimensions: energy storage output time, output amplitude, active and reactive power coordination, so as to take into account the favorable timing and magnitude of energy storage, which enables the energy storage power station to play a better role in restraining the commutation failure of UHV AC/DC hybrid system.

Those skilled in the art should understand that embodiments of the present invention may be provided as methods, systems, or computer program products. Therefore, the present invention may take the form of complete hardware embodiments, complete software embodiments, or embodiments combining software and hardware. In addition, the present invention may take the form of a computer program product implemented on one or more computer available storage media (including, but not limited to, disk memory, CD-ROM, optical memory, etc.) containing computer available program codes.

The invention should understand that the combination of each flow and/or block in the flowchart and/or block diagram and the combination of the flow and/or block in the flowchart and/or block diagram can be realized by computer program instructions. These computer program instructions may be provided to a processor of a general-purpose computer, special purpose computer, embedded processor or other programmable data processing device to generate a machine. Accordingly, instructions executed by a processor of a computer or other programmable data processing device generate a device for implementing a function specified in a flowchart one or more processes and/or block diagrams.

It is easy for those skilled in the art to understand that the above are only better embodiments of the invention and are not used to limit the invention, and any modifications, equivalent replacements and improvements made within the spirit and principles of the invention, shall be included in the scope of protection of the invention.

What is claimed is:

1. An energy storage transient power coordinated control method for restraining subsequent commutation failures, comprising the following steps:
   S1: detecting a DC current, a AC bus voltage, and a arc quenching angle on a inverter side, and
   controlling an energy storage power station to enter a transient control mode, when the DC current is greater than a first current threshold, the AC bus voltage is less than a voltage threshold, or the arc quenching angle is less than a first arc quenching angle threshold;
   S2: determining an output time instruction corresponding to an active output of an energy storage by using a relationship between the DC current, the first current threshold, and a second current threshold, the first current threshold being greater than the second current threshold; and
   determining an output time instruction corresponding to a reactive power output of the energy storage by using a relationship between the inverter arc quenching angle, the first arc quenching angle threshold, and a second arc quenching angle threshold, the first arc quenching angle threshold being less than the second arc quenching angle threshold;
   S3: determining an output amplitude instruction corresponding to the active power output of the energy storage by using a relationship between the AC bus voltage and the voltage threshold; and
   determining an output amplitude instruction corresponding to the reactive power output of the energy storage by using a constraint of a total energy storage capacity; and
   S4: issuing the output time instruction and the output amplitude instruction corresponding to the active power output and the reactive power output of the energy storage of a target output amplitude to the energy storage power station at a target output time, the output time instruction carries the target output time, and the output amplitude instruction carries the target output amplitude.

2. The energy storage transient power coordinated control method for restraining subsequent commutation failures of claim 1, characterized in that the step S2 comprises:
   S201: issuing an active power descending edge instruction when the DC current being greater than the first current threshold is detected, the value $P_T$ of the output time instruction corresponding to the active output of an energy storage being −1, the active power descending edge instruction being used to control the energy storage power station to absorb an active power of the inverter side of the high voltage direct current (HVDC) system;
   issuing a reactive power rising edge instruction when the arc quenching angle being less than the first arc quenching angle threshold is detected, the value of the reactive power output time instruction $Q_T$ being 1, the reactive power rising edge instruction being used to control the energy storage to release a reactive power to the inverter side of the HVDC system;
   S202: maintaining $P_T$ to be −1 when the DC current decreasing to be successively lower than the first current threshold and the second threshold is detected;
   maintaining $Q_T$ to be 1 when the arc quenching angle increasing to be successively larger than the first arc quenching angle threshold and the second arc quenching angle threshold is detected;
   S203: changing $P_T$ to 0 when the DC current rising to exceed the second current threshold is detected; changing $Q_T$ to 0 when the arc quenching angle reducing to be less than the second arc quenching angle threshold is detected, the;
   S204: performing the step S201 when the DC current rising to exceed the first current threshold is detected, or when the arc quenching angle reducing to be less than the first arc quenching angle threshold is detected.

3. The energy storage transient power coordinated control method for restraining subsequent commutation failures of claim 2, characterized in that after the step S203, the step S2 further comprises:
   S205: issuing the active power rising edge instruction and making a duration of the value $P_T$ of the output time instruction corresponding to the active output of an energy storage exceed an active time threshold when the DC current $I_{dct}$ exceeds the second current threshold $I_{drefL}$ for the first time during a recovery process after a first commutation failure on the inverter side, so as to avoid short-term repeated trigger caused by high-frequency oscillation of the DC current near the second current threshold;
   issuing the reactive power falling edge instruction and making the duration of the value $Q_T$ of the output time instruction corresponding to the reactive output of an energy storage exceed a reactive power time threshold when the arc quenching angle is lower than the second arc quenching angle threshold for the first time during the recovery process after each commutation failure on the inverter side, so as to avoid short-term repeated triggers caused by high-frequency oscillation of the arc quenching angle near the second arc quenching angle threshold.

4. The energy storage transient power coordinated control method for restraining subsequent commutation failures of claim 3, characterized in that, before the step S205, the energy storage transient power coordinated control method for restraining subsequent commutation failures further comprises:
   setting the active power time threshold to 8 ms and setting the reactive power time threshold to 5 ms.

5. The energy storage transient power coordinated control method for restraining subsequent commutation failures of claim 1, is characterized in that, the step S3 comprises:
   S301: recording a value $P_A$ of an active output amplitude instruction outputted as $P_1$ when the AC bus voltage is lower than the voltage threshold and the DC current exceeds the preset range;

otherwise, recording the value $P_A$ of the active output amplitude instruction outputted as $P_2$, wherein $P_1 > P_2$, S302: determining an reactive power output amplitude instruction according to the active power output amplitude instruction and a capacity constraint of the energy storage itself.

6. The energy storage transient power coordinated control method for restraining subsequent commutation failures of claim 5, characterized in that, wherein, $$P_1 = 7.5\% \ P_{dc} + \frac{P_{dc}^2 f U_{f0.1}}{20 U_N^2};$$

where $P_{dc}$ is a rated DC transmission power of HVDC system, f is a rated frequency off AC system, $U_N$ is a rated effective voltage of AC bus on the inverter side, and $U_{f0.1}$ is the AC bus voltage of 0.1 s after an AC bus fault on the inverter side;

$P_2 = 7.5\% \ P_{dc}$.

7. The energy storage transient power coordinated control method for restraining subsequent commutation failures of claim 6, characterized in that, wherein:

an output value of an amplitude value corresponding to the reactive power of the energy storage is $Q_A = \sqrt{S_{BESS}^2 - (P_T P_A)^2}$, wherein $S_{BESS}$ is an energy storage capacity.

8. The energy storage transient power coordinated control method for restraining subsequent commutation failures of claim 7, characterized in that, before the step S302, the energy storage transient power coordinated control method for restraining subsequent commutation failures further comprises:

setting a sample hold time of $U_{f0.1}$ to 1s.

9. The energy storage transient power coordinated control method for restraining subsequent commutation failures of claim 1, characterized in that, the step S4 comprises:

S401: determining the target output time from a rising edge time or a falling edge time in the output time instruction; taking the output amplitude instruction corresponding to an output value as the target output amplitude;

S402: outputting the energy storage active power instruction corresponding to the target output amplitude at the target output time, a value of the energy storage active power instruction being an algebraic product of a value of the output time instruction corresponding to the active output of an energy storage and a value of the output amplitude instruction corresponding to the active output of an energy storage;

outputting the energy storage reactive power instruction corresponding to the target output amplitude at the target output time, a value of the energy storage reactive power instruction being an algebraic product of a value of the output time instruction corresponding to the reactive output of an energy storage and a value of the output amplitude instruction corresponding to the reactive output of an energy storage.

10. The energy storage transient power coordinated control method for restraining subsequent commutation failures of claim 1, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

11. The energy storage transient power coordinated control method for restraining subsequent commutation failures of claim 2, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

12. The energy storage transient power coordinated control method for restraining subsequent commutation failures of claim 3, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

13. The energy storage transient power coordinated control method for restraining subsequent commutation failures of claim 4, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

14. The energy storage transient power coordinated control method for restraining subsequent commutation failures of claim 5, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

15. The energy storage transient power coordinated control method for restraining subsequent commutation failures of claim 6, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

16. The energy storage transient power coordinated control method for restraining subsequent commutation failures of claim 7, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

17. The energy storage transient power coordinated control method for restraining subsequent commutation failures of claim 8, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

18. The energy storage transient power coordinated control method for restraining subsequent commutation failures of claim 9, characterized in that, before step S2, the energy storage transient power coordinated control method for restraining subsequent commutation failures further comprises:

controlling the energy storage power station keep maintaining a value of the energy storage active power instruction as 0 when the DC current is less than or equal to the first current threshold, or when the AC bus voltage is greater than or equal to the voltage threshold;

controlling the energy storage power station keep maintaining a value of the energy storage reactive power instruction as 0 when the arc quenching angle is greater than or equal to the first arc quenching angle threshold.

\* \* \* \* \*